United States Patent [19]

Cook

[11] Patent Number: 5,848,835
[45] Date of Patent: Dec. 15, 1998

[54] DETACHABLE COAXIAL ILLUMINATOR VIEWING ACCESSORY FOR FLASHLIGHTS

[76] Inventor: Walter J. C. Cook, 1201 W. Arbrook Blvd., #121-914, Arlington, Tex. 76015

[21] Appl. No.: 635,206

[22] Filed: Apr. 17, 1996

Related U.S. Application Data

[60] Provisional application No. 60/0022463, Aug. 16, 1995.
[51] Int. Cl.⁶ .............................. F21L 7/00; F21V 33/00
[52] U.S. Cl. .......................... 362/208; 362/138; 362/139
[58] Field of Search ..................... 362/138, 139, 362/186, 187, 194, 208; 128/9; 356/239, 241

[56] References Cited

U.S. PATENT DOCUMENTS

| | | | |
|---|---|---|---|
| 1,587,151 | 6/1926 | De Zeng | 362/187 |
| 2,222,879 | 11/1940 | Porter | 362/138 |
| 2,899,856 | 8/1959 | Shull | 362/139 |
| 3,373,737 | 3/1968 | Moore et al. | 362/208 |
| 3,556,086 | 1/1971 | Gordon | 362/139 |
| 3,638,643 | 2/1972 | Hotchkiss | 128/9 |
| 3,892,494 | 7/1975 | Baker et al. | 356/239 |
| 4,120,563 | 10/1978 | Stefanou | 362/138 |
| 4,659,221 | 4/1987 | Kellie et al. | 356/241 |
| 4,823,244 | 4/1989 | Alaybayoglu | 362/194 |
| 5,644,438 | 7/1997 | Pottash | 362/138 |

FOREIGN PATENT DOCUMENTS

| | | |
|---|---|---|
| 346290 | 2/1937 | Italy . |
| 3795 | of 1890 | United Kingdom ................. 362/138 |

*Primary Examiner*—Sandra L. O'Shea
*Assistant Examiner*—Matthew J. Spark

[57] ABSTRACT

A conveniently detachable lighted-magnifier accessory for use with a high-brightness, focusable-beam flashlight, that provides true coaxial illumination for shadow-free viewing of a wide variety of subject matter as well as to the bottom of small holes, is disclosed. Light from an attachable flashlight is reflected by a beamsplitter onto the subject matter. An observer views the illuminated subject matter through a beamsplitter through a magnifying lens or clear window.

3 Claims, 2 Drawing Sheets

DETACHABLE COAXIAL ILLUMINATOR VIEWING ACCESSORY FOR FLASHLIGHTS

I claim the priority date of my Provisional Application for the herein described invention dated Aug. 16, 1995 and filed under Ser. No. 60/002463, now abandoned.

BACKGROUND-FIELD OF INVENTION

This invention relates to a detachable lighted-magnifier viewing accessory for a popular commercially available flashlight that, when used with the flashlight, provides coaxial illumination and thereby permits the user to see clearly to the bottom of holes, as well as to view detail on surfaces. It is well suited for general use by the public, and also for those involved in technical and scientific work.

BACKGROUND-DESCRIPTION OF PRIOR ART

Drug and hardware stores commonly supply consumers with self-contained, battery-operated lighted magnifiers which, although are adequate for surface viewing, do not permit the user to see clearly to the bottom of holes, or surface detail near large surface irregularities. This is because the illumination is incident at a large angle with respect to the viewing axis, so it casts troublesome shadows in the viewing area. A few specialty flashlights have been manufactured to permit viewing into holes, and in some cases, surface detail as well, but they are expensive (because the flashlight is an integral part of the device) and lack versatility, since they can be used only for viewing objects because the flashlight may not be removed.

Also, the illumination may be only approximately coaxial, and if so, the viewing clarity into holes will be less than optimum. These commercial designs differ optically from that of my invention as disclosed in this patent application. U.S. Pat. No. 4,659,221 to General Electric describes a device for hole viewing that is optically similar to mine, but it is a specialty device designed for examining holes in turbine blades, and so lacks the needed versatility of a device for use by the general public.

OBJECTS AND ADVANTAGES

My invention has the following advantages over prior art:

(a) It provides superior viewing brightness and clarity for both holes and surfaces because it combines true coaxial illumination with a new-technology, high-brightness, focusable-beam flashlight.

(b) It can be produced at a fraction of the cost of the specialty flashlights now available for hole viewing because it is an inexpensive accessory to a very popular flashlight that many prospective users already own. All of the hard parts may be quantity manufactured in low-cost plastic.

(c) Because it is a conveniently detachable flashlight accessory, the owner's flashlight may be used as an ordinary flashlight with the accessory removed.

(d) Although the preferred embodiment of my invention is for use with a high-brightness, focusable-beam, size-AA flashlight, this design can be adapted for use with any flashlight.

SUMMARY

The reader will see that my coaxial illuminator flashlight accessory provides clear viewing to the bottom of small holes because its illumination axis is parallel to the viewing axis, so annoying shadows are eliminated from the viewing area. When it is used with a high-brightness, focusable-beam flashlight, copious light illuminates holes, thereby providing a bright view even into holes in dark-colored surfaces. Coaxial illumination also provides optimal viewing of surfaces because the light is always "aimed" directly at the subject matter. The illuminator is very easy to attach and separate from the flashlight because the simple O-ring mechanism pinches the flashlight in place, so it simply "snaps" in and out of the illuminator housing. Since the design is well suited for all-plastic construction, the invention is cost effective to fabricate.

DRAWINGS AND FIGURES

FIG. 1 and FIG. 2 show a cut-away view and a 3-D view respectively, of my invention.

Reference Numbers in the Drawings

| | |
|---|---|
| 8 Light from flashlight | 20 O-ring |
| 10 Opaque housing | 21 Flashlight stop |
| 11 Unwanted light component | 22 Plstic end cap |
| 12 Eyepiece Body | 23 Working distance |
| 13 Useful light component | 24 Black velvet-like absorbing sulfate |
| 14 Positive Lens, lenses, or window | 26 Hole in Eyepiece, 12 |
| 15 Light reflected from subject surface | 28 Hole on housing, 10 |
| 16 O-rings (2) | 30 Subject Surface |
| 18 Plate beamsplitter | |

BRIEF DESCRIPTION OF THE DRAWINGS

The preferred embodiment of my detachable coaxial illuminator flashlight accessory is for use with an AA-size focusable-beam, high-intensity flashlight, such as the MINI-MAGLITE, and it is shown in FIGS. 1 and 2. It consists of an opaque plastic housing 10 into which an opaque plastic eyepiece body 12 is built. Other suitable opaque materials besides plastic may be used for the housing 10 and eyepiece body 12. The eyepiece body 12 contains a lens 14, but a lens system, or clear window may be used. Lens 14 is held in place in the eyepiece body by 2 O-rings 16 which are bonded to the inner wall of the eyepiece body with rubber adhesive (RTV), but other suitable mounting methods, such as a step in the wall similar to step 21, or set screws may be used. The eyepiece is cut at a 45 degree angle on the end inside the housing, as shown in FIG. 1, and a clear plastic (polycarbonate) oval-shaped beamsplitter 18 is bonded to this end. Other suitable transparent materials may be used for the beamsplitter. A hole 26 in the eyepiece body opposite the 45 degree cut end is provided. The flashlight fits into the left side of the housing as shown in FIGS. 1 and 2, and is held in place by a lubricated O-ring 20, but other suitable attachment methods for the flashlight may be used, including a thumbscrew or even use of a flexible housing. A small step 21 in the inner wall of the housing acts as a stop for the flashlight, but this may be unnecessary depending on the design of the lighted end of the flashlight, or some other suitable means may be used in place of the stop. A plastic end cap 22 having a black velvet-like light absorbing surface 24 covers the end of the housing opposite the flashlight. A hole 28 is provided in the housing directly below the plastic beamsplitter to allow viewing of the subject surface 30 below. A small mirror mounted at 45 degrees with respect to the axis of the light reflected from the surface 15 placed either below the beamsplitter 18 or above the lens 14, may be used to provide right angle viewing. The device is normally stored in a plastic zip-lock bag to protect the optics from dust and damage, and to preserve the O-ring lubricant.

DESCRIPTION OF THE PREFERRED EMBODIMENT

Figure 1:
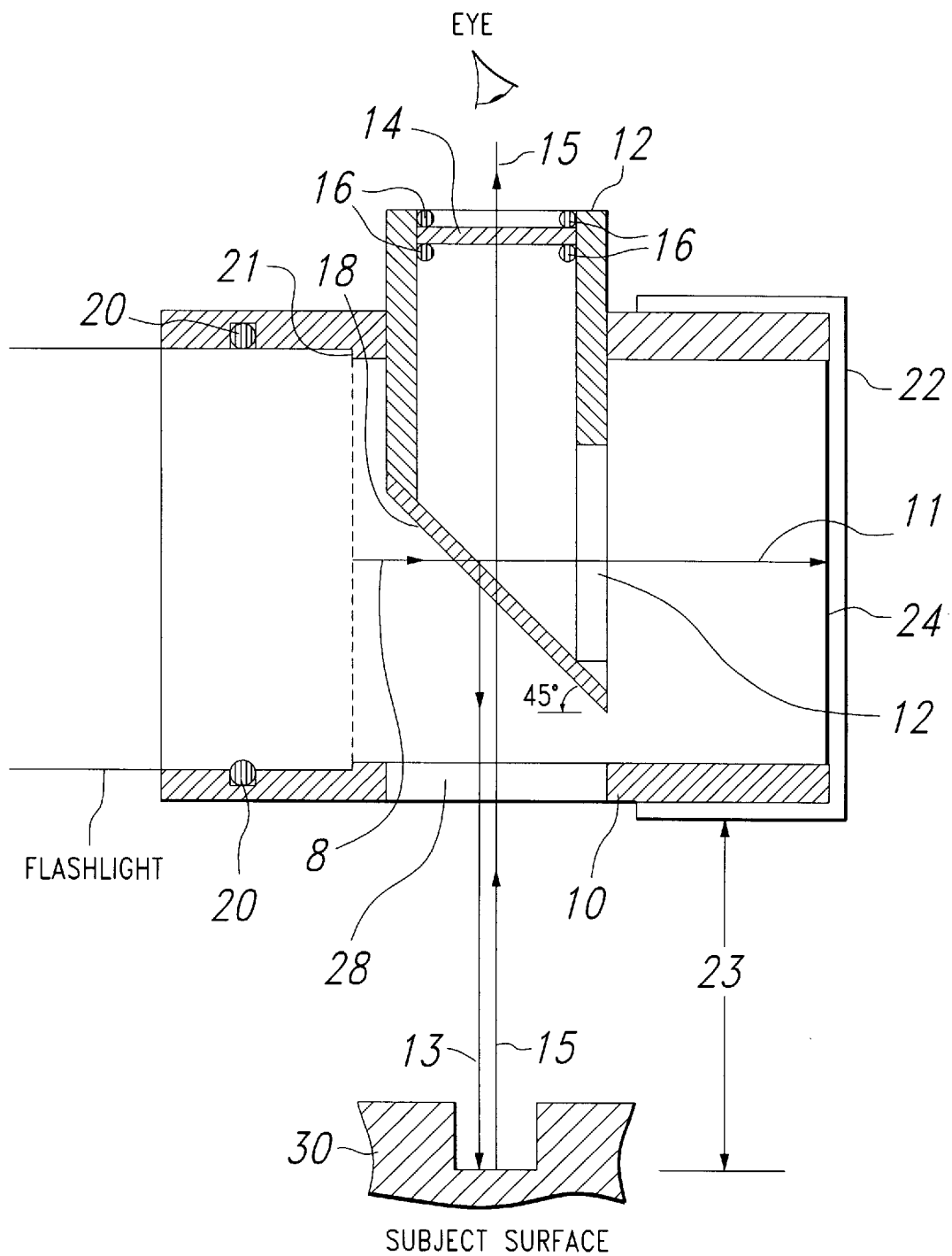
Figure 2:
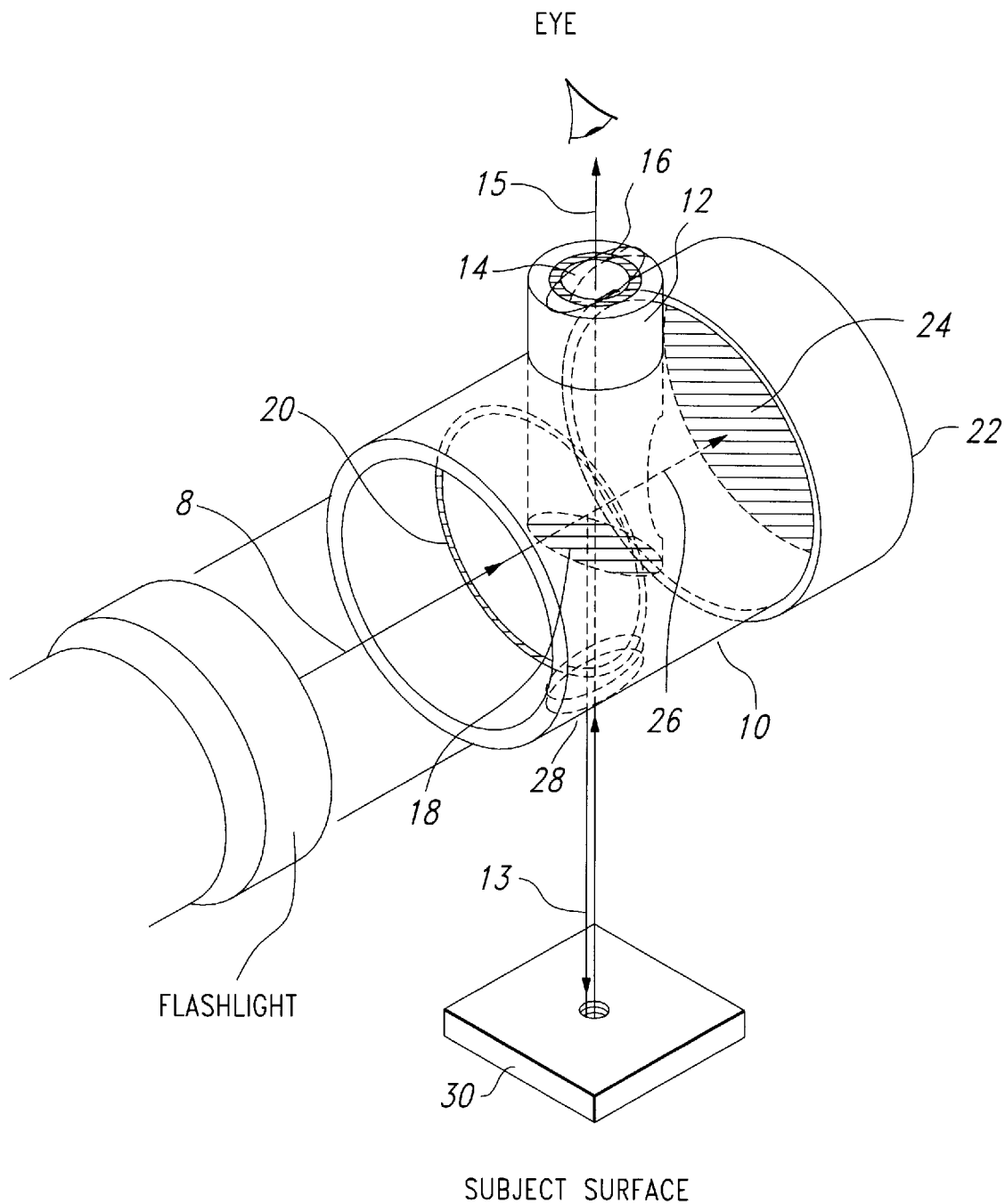

The flashlight is inserted into the left side of the opaque housing 10 as shown in the figures, and is snugly held in place by the O-ring 20, which accomodates small variations in size of both the flashlight body and opaque housing due to manufacturing tolerances. A small amount of grease on the O-ring aids insertion and removal, and the flashlight is removed simply by pulling it out of the housing. A small step 21 in the inner wall of the housing acts as a stop for the flashlight. This may be unnecessary if the flashlight has a suitable feature on its outer surface that prevents it from being inserted so far as to contact and possibly damage the beamsplitter or eyepiece housing. The flashlight beam is focused for the smallest spot size on the subject surface, 30. Light from the flashlight 8 enters the coaxial illuminator, and strikes a plate beamsplitter 18. The useful light component 13 is reflected off the beamsplitter downward in the figure, through the exit hole 28 in the housing toward the subject surface 30, while the unwanted light component 11 transmitted through the beamsplitter 18, and hole 26, is incident on a black velvet-like light absorbing surface 24 where it is nearly totally absorbed to prevent glare in the view field of the subject surface. Other suitable light absorbers may be used in place of the black velvet-like material. The user's eye looks down from the top in the figure through a simple magnifying lens 14, which may be replaced by a lens system or clear window, in the coaxial illuminator and sees the light reflected from the subject surface 30 below that is transmitted back up through the beamsplitter. The image of the subject surface 30 is brought sharply into focus by adjusting the distance between the illuminator and the surface. With the subject sharply focused, his is called the working distance, 23. Simple lenses of 2.7 to 8.5 inches in focal length, providing magnifications of about 3.7 to 1.2 respectively, have been used with good results. Lenses of the longer focal length provide a longer working distance 23, so one can see to the bottom of deeper holes, but with less magnification. If the simple lens is replaced by a suitable lens system, both long working distance and high magnification can be obtained. Alternately, a clear window permits viewing at any distance to the limit of the illuminating power of the flashlight, and has been used with good results for viewing up to a distance of about 18 inches for the flashlight of this embodiment. (Those persons who normally use reading glasses may benefit from their use when viewing through this illuminator if a clear window is used instead of a focusing means for lens 14.) A magnifying lens performs somewhat better than a clear window because the lens defocuses the small amount of glare from the beamsplitter 18 and velvet-like light absorbing surface 24, making it less noticeable, when the subject surface 30 is sharply in focus. A small mirror mounted at 45 degrees with respect to the axis of the light reflected from the surface 15 placed either below the hole 28 or above the lens 14 as shown in FIGS. 1 and 2 may be used to provide right angle viewing. Note that in my invention the viewing axis is parallel to the illumination axis (hence, the term "coaxial illuminator"), so troublesome shadows are eliminated from the viewing area, and viewing even into deep holes is thereby possible.

I claim:

1. A viewing accessory for use with a nonphotographic flashlight, to provide coaxial illumination, consisting of:
    a) an opaque tubular housing having an open end and a closed end, said open end having gripper means therein for removable attachment of the accessory to said flashlight;
    b) a light absorbing surface within said housing, on said closed end;
    c) an optical beamsplitter fixed at an angle within said housing, positioned to reflect and transmit a focused beam of light from said flashlight;
    d) a viewing lens on said housing, positioned to receive light transmitted by said beamsplitter;
    e) an opening in said housing, opposite said lens, through which light is directed for illumination of the viewed object, and coaxially relected back through the beamsplitter to said lens.

2. An accessory as in claim 1, wherein the open end of said housing has an inner diameter that substantially matches the outer diameter of the beam-emitting end of said flashlight.

3. A viewing accessory for use with a nonphotographic flashlight, to provide coaxial illumination, consisting of:
    a) an opaque tubular housing having an open end and a closed end, said open end having an inner diameter that substantially matches the outer diameter of the beam-emitting end of said flashlight;
    b) a circumferential slot within said open end of the housing, and an O-ring in said slot, suitable for gripping said flashlight;
    c) a light-absorbing surface within said housing, on said closed end;
    d) an optical beamsplitter fixed at an angle within said housing, positioned to reflect and transmit a focused beam of light from said flashlight;
    e) a viewing lens on said housing, positioned to receive light transmitted by said beamsplitter;
    f) an opening in said housing, opposite said lens, through which light is directed for illumination of the viewed object, and coaxially reflected back through the beamsplitter to said lens.

* * * * *